May 1, 1956 R. J. WHITE 2,743,889
AIRCRAFT STABILIZING CONTROL MECHANISM
Filed May 31, 1952 7 Sheets-Sheet 1

INVENTOR.
ROLAND J. WHITE
BY
Reynolds, Beach & Christman
ATTORNEYS

May 1, 1956 R. J. WHITE 2,743,889
AIRCRAFT STABILIZING CONTROL MECHANISM
Filed May 31, 1952 7 Sheets-Sheet 2

INVENTOR.
ROLAND J. WHITE
BY
ATTORNEYS

INVENTOR.
ROLAND J. WHITE

BY
ATTORNEYS

May 1, 1956  R. J. WHITE  2,743,889
AIRCRAFT STABILIZING CONTROL MECHANISM
Filed May 31, 1952  7 Sheets-Sheet 4

INVENTOR.
ROLAND J. WHITE
BY
ATTORNEYS

May 1, 1956 R. J. WHITE 2,743,889
AIRCRAFT STABILIZING CONTROL MECHANISM
Filed May 31, 1952 7 Sheets-Sheet 5

INVENTOR.
ROLAND J. WHITE
BY
ATTORNEYS

May 1, 1956 R. J. WHITE 2,743,889
AIRCRAFT STABILIZING CONTROL MECHANISM
Filed May 31, 1952 7 Sheets-Sheet 6

INVENTOR.
ROLAND J. WHITE
BY
Reynolds, Beach & Christensen
ATTORNEYS

United States Patent Office 2,743,889
Patented May 1, 1956

2,743,889

AIRCRAFT STABILIZING CONTROL MECHANISM

Roland J. White, Seattle, Wash., assignor to Boeing Airplane Company, Seattle, Wash., a corporation of Delaware Application May 31, 1952, Serial No. 290,993

16 Claims. (Cl. 244—76)

In large airplanes it is difficult for the pilot to sense quickly departures from a straight course. Consequently, when the pilot does sense such a departure he is inclined to overcontrol to restore the airplane to its proper course. Moreover, the present trend is toward airplanes of ever higher speed, and the higher the speed, normally the farther an airplane may be diverted from its course, such as by a sudden gust, before restorative action can be initiated by the pilot, and the more sensitive such an airplane is to control movements, the more apt such restorative action is to swing the airplane farther than necessary in the restoring direction. The resulting hunting movement of the airplane is particularly aggravating about the yaw axis in rough air.

The present invention relates to aircraft stabilizing control mechanism, and especially to mechanism which will act automatically to reduce the amplitude through which an airplane will hunt about its vertical or yaw axis, and the number of yaw cycles, when it is displaced from a straight flight path, such as by a lateral gust of wind acting on the side of the empennage.

It is especially an object of the present invention to provide such mechanism which is of mechanical character rather than relying upon an electronic or other electric control to effect the stabilizing operation. A further object is to provide such mechanism which can be adjusted to afford different types of stabilizing performance characteristics, so that it can be best adapted to any particular airplane.

Large airplanes, to which the present invention is especially adapted, ordinarily cannot be flown readily by the application of the force which the pilot is capable of exerting being applied directly to the control surface of the airplane, for example the rudder. On the contrary, usually some assisting mechanism, such as a power control, or a servo or control tab which effects movement of the main control surface aerodynamically, is employed. A further object, therefore, is to provide stabilizing control mechanism which can be combined with a power type of control or a control tab for actuating the rudder, for example.

A more specific object is to apply such mechanism to actuate a control tab on a swingable airplane rudder, and an associated object is to interconnect such control tab operated by the automatic stabilizing mechanism with a pilot-operated control tab for cumulative effect on the control surface to effect maximum voluntary control of the control surface.

An additional object is to make such mechanism of extremely reliable character, yet simple in construction and light.

A further object is to enable such automatic control mechanism to be integrated with power mechanism for moving an airplane rudder as an alternative to pilot actuated control of the power mechanism.

In general, the stabilizing control mechanism incorporates a bob weight which will be moved relative to the airplane empennage when such empennage is displaced laterally abruptly, such as by a gust. Associated with such bob weight is a viscous damper which will cause the movement of the bob weight relative to the airplane to lag behind the yawing movement of the airplane about its vertical axis. In addition, aerodynamic mechanism is provided which will effect restoration of the bob weight to its neutral position when yaw of the airplane has been quelled.

More specifically, the viscous damper associated with the bob weight may be of the hydraulic viscous friction type or of the magnetic eddy current type. The bob weight and viscous damper mechanism may be connected to a combined control and aerodynamic restoring element, such as a stabilizing tab, to effect stabilizing movement of the rudder. Alternatively the restoring and stabilizing control elements may be separate, the restoring action being accomplished by an impact air pressure operated restoring mechanism, for example, and such mechanism and a stabilizing control being connected into power mechanism for swinging the rudder.

As a further feature, if the bob weight and viscous damper mechanism are connected to operate a stabilizing tab and voluntary movement of the rudder is effected by a pilot-actuated control tab, interconnecting mechanism may be provided to coordinate the swinging of the stabilizing tab with that of the control tab effected by voluntary action of the pilot, to produce increased aero-dynamic force on the rudder at the will of the pilot.

The bob weight and viscous damper mechanism may be mounted in various locations in the after portion of the airplane, but preferably they are housed in the empennage, either in the vertical fin or in the rudder itself. In the latter case the bob weight should be disposed in the lateral plane of the rudder's hinge axis, so that its movement relative to the airplane will be responsive to lateral displacement of the empennage but will be insensitive to voluntary swinging movement of the rudder relative to the airplane.

Figure 3 is a top perspective view of the bob weight element of the present invention associated with a hydraulic type of viscous damper, while Figure 4 is a top perspective view of a bob weight employing a magnetic flux type of viscous damper.

Customarily lateral control of airplanes is accomplished by the combination of a vertical fin and a rudder hinged upon its trailing edge. Since the particular structure and configuration of these elements vary from one airplane to another, the application of the present invention to such empennage structure is shown diagrammatically in Figures 1 and 2. Thus the tail of the airplane fuselage 1 has horizontal stabilizers 10 projecting oppositely from its sides and a vertical fin 11 projecting upward from it. The rudder 12 is mounted on this vertical fin, swingable about the hinge line 13. To illustrate one application of the invention, the rudder is shown as being movable for maneuvering the airplane by the aerodynamic effect upon it of a control tab 14 operable voluntarily by the pilot moving the control 15 connected to such tab by the linkage 16, or the rudder may be swung aerodynamically by movement of the stabilizing tab 17 relative to it, or by coaction of the two tabs 14 and 17.

Figure 1:
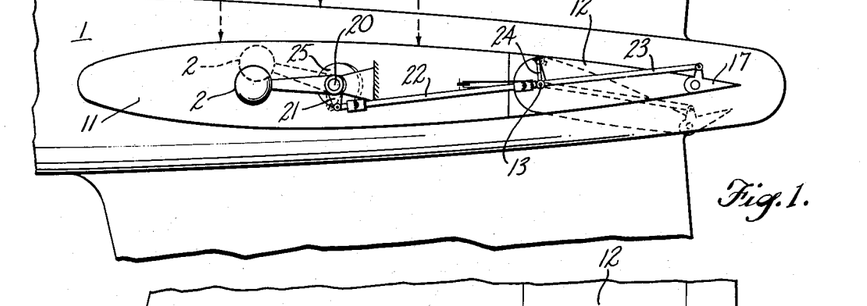
Figure 1 is a diagrammatic horizontal section and Figure 2 is a diagrammatic vertical section of aircraft stabilizing mechanism incorporating the present invention.

To actuate the stabilizing tab 17 inertia means in the form of a bob weight 2 is mounted on the airplane to be swung relative to it by an abrupt lateral movement of the empennage, such as would be caused by a side gust of air striking the vertical fin 11 and side of the tail portion of the fuselage 11. The bob weight may be housed within the vertical fin 11 on an arm mounted on the fin-supported pivot 20. A bell crank arm 21 integral with the bob weight arm is connected by a link 22 incorporating universal joints to a further link 23 by pivot 13, which latter link in turn is connected to a horn on the stabilizing tab 17. Where the bob weight is mounted ahead of its pivot, as shown, such pivot should be located so that it is inclined forwardly and upwardly when the airplane is at rest upon the ground. The bob weight will then droop and gravity will automatically keep it centered until the air flow is sufficient to produce an aerodynamic centering force on the tab. The pivot 13 is mounted on arm 24 pivoted on the rudder 12 to keep the link joint always substantially coincident with the rudder hinge line. Swinging of the rudder, therefore, will not move the stabilizing tab 17 appreciably relative to the rudder as long as the bob weight is stationary.

Figure 2:
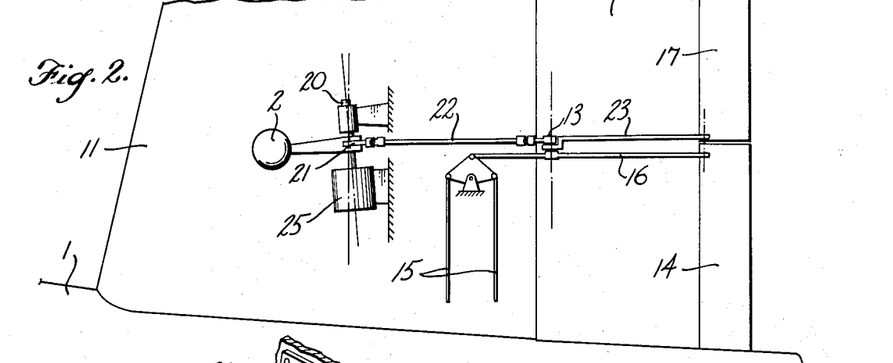
Figures 3, 4:
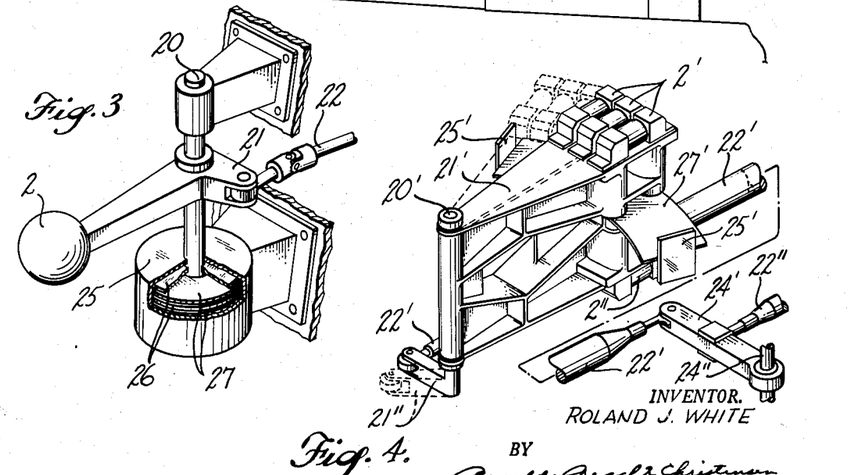

Associated with the bob weight is a viscous damper which may take any of various forms. In Figures 1, 2 and 3 the viscous damper 25 is of the liquid friction type, including alternate fixed and movable plates immersed in a viscous liquid. These plates are disposed close together so that the stationary plates tend to keep the liquid from moving while the moving plates tend to move the liquid. The shearing force thus produced in the liqud and the friction between it and the plates resists movement of the movable plates. In the particular structure illustrated the bob weight supporting bell crank is secured to the rotatable pivot shaft 20 and this shaft also carries the alternate movable plates 26 within the viscous damper. The other alternate plates 27, which are stationary, are fixed to the damper casing.

If, now, a gust should strike the tail portion of the starboard side of the fuselage 1 and the starboard side of the vertical empennage surfaces, the airplane would tend to yaw to starboard. As the tail portion of the airplane is thus moved, the bob weight, because of its inertia, tends to remain stationary in space, so that, relative to the vertical fin 11, it would assume the broken line position shown in Figure 1. Such swinging would, however, be retarded by the interaction of plates 26 and 27 immersed in the viscous liquid. This relative movement of the bob weight and empennage structure would pull the links 22 and 23 to the left as seen in Figure 1, swinging the stabilizing tab 17 to starboard which, in turn, by the aerodynamic action on it, would cause the rudder 12 to swing to port into the broken line position shown. Such swinging of the rudder will, of course, create an aerodynamic force opposing further deflection of the empennage to port and tending to swing it back to starboard, thus to change the heading of the airplane toward port and restore it to the flight path followed prior to the disturbing gust.

The degree of movement of the bob weight, and consequently of the stabilizing tab and rudder, will depend both upon the force of the gust effecting displacement of the empennage and the resistance of the airflow to displacement of the rudder, which varies with the speed of the airplane. A gust-produced force of given value will shift the bob weight less when the airplane is traveling fast because of the opposing force of the airflow acting on the tab and rudder. Moreover, as soon as the gust force is abated the action of the air stream on the rudder and tab will tend to return them and the bob weight to neutral position.

In Figure 4 a permanent magnet, eddy-current inducing type of viscous damper is illustrated which may be substituted for the liquid and plate type of viscous damper shown in Figure 3. Also in this type of mechanism the permanent magnets themselves constitute the bob weight, located aft of the pivot. The bob weight of Figures 1 and 2 may be similarly located by also reversing the position of the tab link connecting bell crank arm. The magnets preferably are arranged in two groups shown as an upper group of magnets 2' and a lower group of magnets 2". Three magnets, for example, of a suitable type may be included in each group. The magnets illustrated are of special horseshoe shape. Both sets of magnets are carried by a swinging frame 21', pivoted to swing about the axis of rod 20' and carrying the crank arm 21". This crank arm is connected to one end of a link 22', the other end of which is connected to the outer end of an arm 24' pivoted at 24''. To this same arm, between link 22' and pivot 24', is connected the forward end of link 22'', which is otherwise mounted like link 22 shown in Figure 1. The position at which the end of link 22'' is connected to arm 24' will, of course, depend upon the movement relationship desired between the displacement of magnets 2' and 2'' and the swinging of stabilizing tab 17.

The damping mechanism of the structure shown in Figure 4 includes the arcuate copper plate or strip 27', which is suitably mounted stationarily within the vertical fin. Bumpers 25' may serve the dual purpose of mounting structure for plate 27' and stops engageable by the swinging magnet bob weight structure at opposite extreme positions. As the magnets swing relative to the vertical fin as a result of displacement of the empennage by a gust of wind as described above, the production of eddy currents in the copper plate 27' by the magnets 2' and 2'', as in an eddy-current brake, will damp swinging of the magnet structure, thus retarding its movement.

Having in mind typical stabilizing control mechanism of the type to which the present invention relates, its effect on an airplane may be considered. When a gust of wind strikes the side of an airplane empennage and tail structure, such structure is displaced to port or starboard depending upon the direction in which the gust acts and upon cessation of the gust the aerodynamic action of the air stream on the vertical fin will swing the tail of the airplane in the opposite direction. Because of the momentum of the airplane when it resumes straight flight, the tail will be displaced to the opposite side of the line of flight until the aerodynamic forces acting on the vertical fin again stop such movement. Thereupon the aerodynamic forces of the air stream acting on the vertical fin will swing the tail back to the side of the flight path toward which it was first displaced. If no control force on such movement of the airplane is effected by manipulation of the rudder, such yaw oscillation of the airplane will continue in substantially simple harmonic motion until damped out by action of the stabilizing control.

Depending upon the force of the disturbing gust or other disturbing force, undesirably large bending stresses may be produced on the airplane fuselage if no steps are taken to restrict the yaw oscillation, and in any event such motion of the airplane is uncomfortable and disquieting for the airplane passengers. For that reason, if no special stabilizing control mechanism is provided, the pilot will attempt to restore the airplane to its straight flight course, but, as has been discussed above, it is difficult for the pilot of a large airplane to sense quickly the yaw displacement caused by a gust and its degree, so that the control movements of the rudder effected by the pilot may occur at the wrong time in the oscillation cycle, or the degree of corrective rudder displacement effected may be improper, or both of these contingencies may occur.

Figures 5, 6, 7 and 8 illustrate diagrammatically one cycle of yaw oscillation and indicate the rudder movement which would be effected by a bob weight without a damper in broken lines and the rudder movement which would be effected by the bob weight and damper combination discussed above in full lines.

Figure 5:
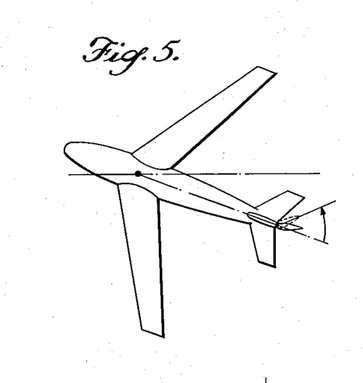
Figures 5, 6, 7 and 8 illustrate various phases of a yawing cycle showing the effect on a control surface of the airplane of the combination of a bob weight and viscous damper as compared with the action of a bob weight alone.

It may be pointed out that when the air or other disturbance effects displacement of the airplane empennage, for example to port as illustrated in Figure 5, it is not necessary to swing the rudder for the purpose of restoring the airplane to straight flight. The aerodynamic force acting on the vertical fin automatically produces such a restoring force. The problem is to stop the airplane when it again reaches straight flight position instead of a prolonged yaw oscillation of considerable amplitude being set up. Ideally, the airplane should be restored to a straight path condition and prevented from swinging past it, but such theoretically desirable operation is not feasible.

The aim of the present stabilizing control mechanism is, therefore, primarily to reduce the amplitude of such oscillation and secondarily to reduce the duration of the oscillation.

Figure 9:
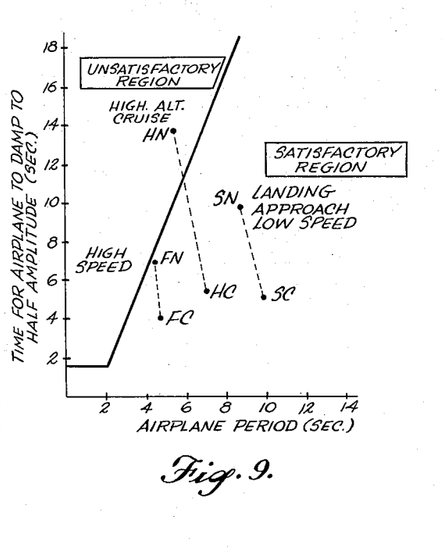
Figure 9 is a graph showing the effect on the stability of the airplane resulting from utilization of the present stability control.
Figure 10:
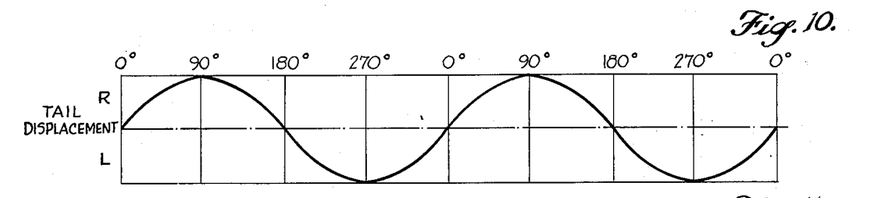
Figures 10, 11, 12, 13, 14 and 15 are related graphs illustrating, respectively, in two yaw cycles the relationship between displacement of the tail, velocity of tail movement, acceleration of such tail movement, the preferred rudder positions, the effect on the rudder obtained by the use of an undamped bob weight and the effect obtained on the rudder where the combination of a bob weight and a viscous damper is employed.
Figure 11:
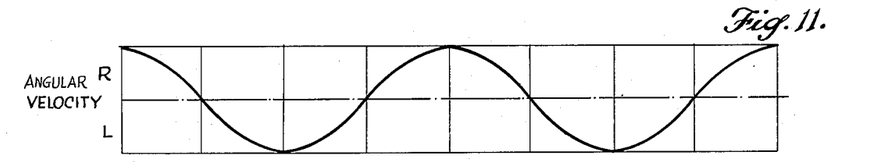
Figure 12:
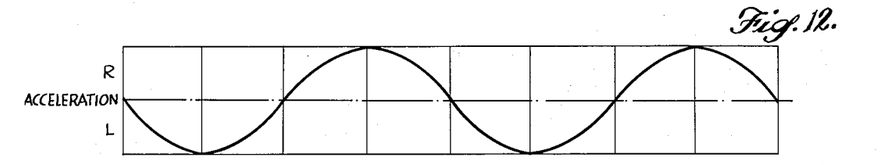

Figure 9 shows the calculated effect of the present stabilizing control on an airplane as compared to one without such control for typical flight situations with respect to the time of oscillation damping. Under high speed flight conditions the period of airplane oscillation is relatively short, because the force of the air stream on the vertical fin is relatively high. When a given airplane was traveling fast, therefore, it was calculated that the period of oscillation for a selected disturbing force would be between four and five seconds. Without any stabilizing control the oscillation would not reduce to less than half its initial amplitude in less than about seven seconds. On the other hand, the oscillation of such an airplane, provided with the present stabilizing control, would be reduced to one-half the initial amplitude in approximately four seconds, although the period of oscillation would be practically the same. This comparison is indicated in Figure 9 by the points FN and FC, respectively.

When the airplane is traveling slowly the aerodynamic restoring force on the vertical fin is much less than under high speed conditions, and consequently the oscillation is relatively sluggish. Under such slow speed conditions, such as when the airplane is making a landing approach, the period of oscillation for a given disturbing force may, for example, be ten seconds. Without any stabilizing control the airplane for which the study in Figure 9 was prepared would pass through a complete cycle of oscillation before the amplitude was reduced to one-half the initial amplitude which is represented by point SN. With the present control, however, the amplitude of oscillation would be reduced to one-half the initial amplitude in a half cycle, that is, in five seconds approximately where the period of oscillation is ten seconds. This condition is represented by the point SC in Figure 9.

Both from the point of view of passenger comfort and the production of undesirable stresses on the airplane, the time required to reduce the amplitude of oscillation is less critical when the period of oscillation is relatively long, such as at low speeds. Consequently, the chart of Figure 9 is divided into two sections, one in which the time required for reduction of oscillation amplitude to one-half the initial value is unsatisfactory, and the other in which the time is satisfactory. While the period required for damping the oscillation to one-half amplitude is much less where the instant control is used, even at low speeds, the greater time for such damping at these speeds is not of controlling significance. It is found, however, that the greatest difference in time for reducing the amplitude of oscillation occurs at high altitude where the rarified air does not exert as much damping force on the vertical fin for a given displacement at a selected speed. The difference in damping time at cruising speed of the airplane between the conventional control and the present control at high altitude flight conditions is indicated by a comparison of points HN and HC in Figure 9. With the conventional control the amplitude of oscillation will not be reduced to one-half the amplitude of the initial displacement for almost fourteen seconds, which is approximately two and one-half oscillation cycles. Where a stabilizing control of the type described above is incorporated in the airplane, however, the period of oscillation is appreciably longer, and hence less objectionable, being approximately seven seconds instead of approximately five and one-half seconds, and the amplitude of the oscillation is reduced to one-half the initial oscillation in about three-quarters of a cycle. Under this condition of flight, therefore, the stabilizing control effects a highly satisfactory operation, whereas without such control the airplane stability in this regard would be unsatisfactory as indicated by the chart.

Having considered the beneficial effects on the stability of the airplane produced by the stabilizing control, the manner in which the stabilizing mechanism operates to effect such control may be studied. Figures 10 to 15, inclusive, show a family of curves representing two complete cycles of oscillation of the airplane and points 270°, 0°, 90° and 180° in sequence on these curves correspond respectively to the airplane attitudes shown in Figures 5, 6, 7 and 8. For that reason these points are located generally centrally of the curves in Figures 10 to 15. Also, these curves are all of equal amplitude sinusoidal shape representing the correlation between the factors of the several curves instead of taking into account any particular value of the individual factors or change in such values as the oscillation is dampened.

Figure 13:
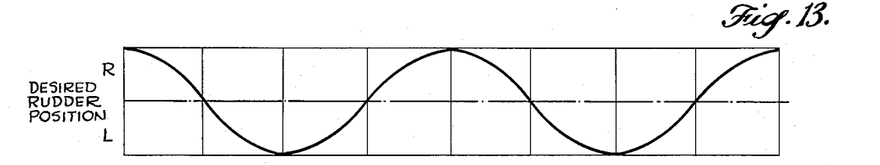

Considering first the 270° position toward the left of all the Figures 10 to 15, inclusive, which correspond to Figure 5 where the tail of the airplane has been displaced to port, it will be noted that, characteristic of simple harmonic motion, while the displacement is maximum the angular velocity is zero, but the acceleration toward straight flight position, that is, opposite to the direction of displacement, is also maximum. As has been discussed above, the action of the air stream on the vertical fin will move the tail of the airplane toward the initial flight path position. It is not necessary that the rudder be deflected to port to aid this action, because that would tend not only to accelerate restoration of the tail and thus reduce the airplane period, which is undesirable, but would also tend to increase the velocity when the tail had reached straight flight path position again, and consequently would make the oscillation generally more violent and prolong the period required to reduce the amplitude to one-half of the initial amplitude even though the amplitude of vibration did gradually decrease. Figure 13, therefore, represents the ideal or desired rudder position for the airplane attitude of Figure 5 as being undeflected, that is, aligned with the vertical fin.

If the bob weight of Figure 3 or Figure 4 were undamped, its position, and consequently the position of the stabilizing tab and rudder, would follow the acceleration curve because it is the acceleration of the airplane empennage which determines the position of the bob weight relative to it. Thus the bob weight will be in its position of maximum displacement from its centered position when the airplane empennage is displaced to the extreme position of Figure 5 and to the extreme position of Figure 7 in which the acceleration toward straight flight path is maximum as indicated by the left 270° point and the right 90° point of Figure 12. Note that the undamped bob weight curve of Figure 14 corresponds exactly to the acceleration curve because of the opposing force of air flow on the tab.

Thus when the tail of the airplane is displaced to port the bob weight, by reason of its inertia, will be moved likewise to port relative to the vertical fin because of the momentum of the bob weight causing it to overtake the movement of the empennage. This movement of the bob weight relative to the fin will swing the stabilizing tab to port, thus moving the rudder to the full starboard position of its oscillation coincident with the empennage reaching its 270° position fully displaced to port. In that position the rudder, instead of reducing the amplitude of oscillation, will tend to increase it.

Figure 14:
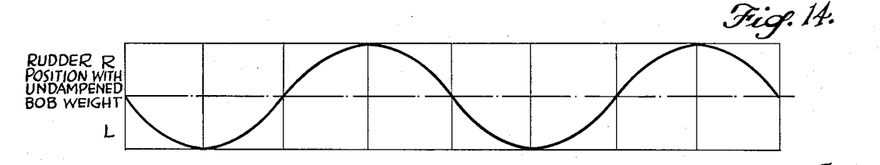
Figure 15:
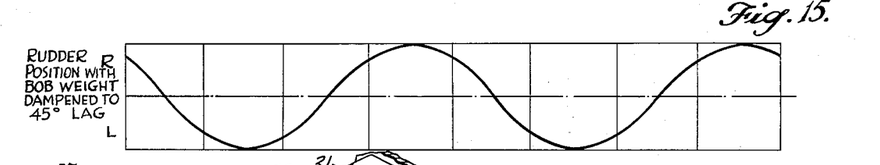

By introducing damping into the operation of the bob weight, however, such as by a viscous damper sufficient to delay the bob weight movement for an angle of, say, 45° of the oscillation cycle, the entire rudder position curve will be shifted to the right from the position of Figure 14 to the position of Figure 15. It will now be evident that for three quarters of the travel of the empennage to port the rudder will be deflected to port relative to the empennage, thus opposing the direction of tail displacement. While the rudder position will reverse in this instance slightly before the position of maximum displacement of the tail, the tendency of the rudder to increase such displacement in this instance will be far less than its displacement bucking action immediately prior to reversal of the rudder position. The rudder upon such reversal will then be in a position to oppose swing of the airplane tail in the opposite direction, and consequently tend to reduce its departure to the opposite side of straight flight, which quickly decreases the oscillation amplitude even though the total duration of the oscillation may not be shortened appreciably.

While the damping also increases the time required for swing of the rudder from one side of the fin to the other, this delay is largely beneficial.

Figures 6, 7, 8:
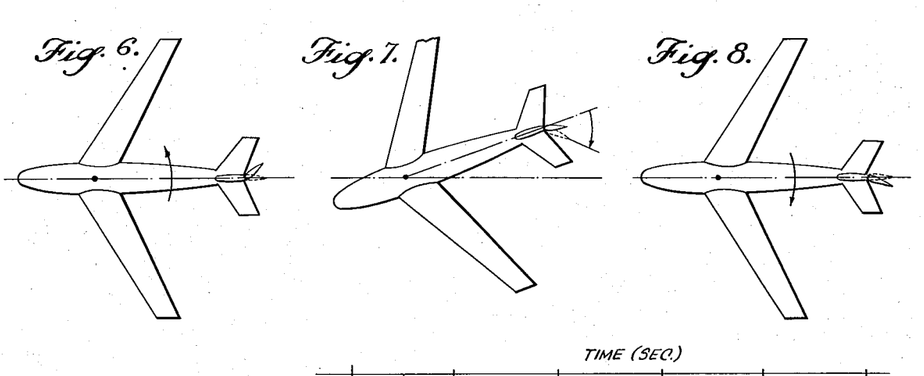

In Figures 5 and 7 the maximum deflected position of the rudder, depending upon air speed and force of disturbance, which would be effected by the undamped bob weight is shown in broken lines, whereas, as shown in full lines, the bob weight having a viscous damper of the type described above which would delay the shift for a period of 45° is shown in full lines as not having reached its fully shifted position. In Figures 6 and 8 the rudder controlled by the damped bob weight is shown as still unmoved, whereas the broken line positions of the rudder controlled by the undamped bob weight are illustrated as in its mid-position of transition from one side of the vertical fin to the other.

Figure 16:
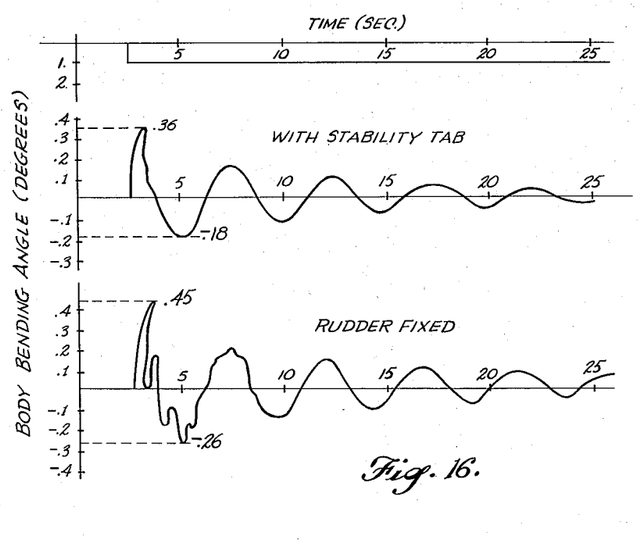
Figure 16 is a graph representing the action of an airplane having its empennage subjected to a side gust, in one instance where the rudder is held fixed and in the other instance where the present stability control is in operation.

In Figure 16 the effect of the air gust disturbance on bending of the fuselage for a given airplane is represented. It will be noted that the calculations show a smaller initial bending effect present with the damped bob weight stabilizing control over an airplane without any stabilizing control, the difference being that between .36° and .45°. Within a half oscillation cycle the stabilizing control reduced the amplitude to one-half of the initial amplitude without any bending reversal during such half cycle. In the calculations for rudder fixed condition, on the other hand, without any stabilizing control, the bending reversed twice within a half oscillation, and the negative deflection after such half oscillation was more than half the initial angular bending.

The stabilizing control thus contributed three definite advantages: First, a reduction in the maximum body bending angle effected by a given disturbing force; second, a quicker reduction in the body bending; and, third, elimination of abrupt bending reversals subordinate to the principal oscillation of the body. The strains in the fuselage are therefore materially less when the stabilizing control is utilized.

While in the foregoing discussion damping has been discussed which would delay reversal of rudder position by an angle of 45° in the oscillation cycle, it may be desirable to provide a greater or lesser amount of damping depending upon the characteristics of the airplane and the type of stabilizing operation desired. In the liquid type of viscous damper shown in Figure 3 the amount of damping can be controlled by the size, number and spacing of the plates 26 and 27 and the characteristics of the liquid in the container 25. In the magnetic eddy current type of viscous damper shown in Figure 4 the amount of damping produced can be varied by changing the number, size and spacing of the magnets 2' and 2", as well as by the radius of the arc through which the magnets swing.

Figure 17:
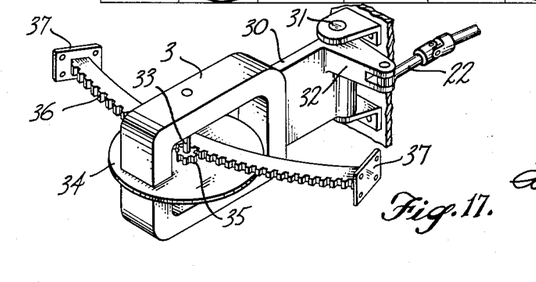
Figure 17 is a top perspective view of a further combination of bob weight and viscous damper of the magnetic damping type, but utilizing an arrangement in which the damping action is increased over that which would result from the combination of Figure 4.

In general the faster the movement of the magnets relative to their armature, the greater will be the damping. A more effective type of magnet eddy current damper than that described above can therefore be provided by increasing the effective velocity between the magnet and the copper plate for a given displacement of the bob weight. Such an arrangement is shown in Figure 17, in which the magnet 3 serves as the bob weight which is mounted on an arm or frame 30 to swing about pivot 31. Frame 30 has a crank arm 32 pivotally connected to the tab-swinging link 22. The magnet is of the horseshoe type, and a shaft 33 is journaled in its opposite legs on which the eddy current disc or plate 34 is secured in position such that its periphery is disposed between the poles of the magnet. Adjacent to the disk 34 is a pinion 35 meshing with an arcuate rack 36, which is suitably mounted in the airplane by end plates 37.

As the magnet 3 swings about its pivot 31 effected by its inertia as the airplane is disturbed, the pinion 35 will be spun to rotate disk 34 between the magnetic poles rapidly as compared to the angular travel of the magnet 30. The eddy current braking action set up by such relative magnet and armature movement will be considerably greater than if merely an arcuate strip, generally similar to the rack bar, were disposed between the magnetic poles and constituted the magnet armature.

The stabilizing control mechanism thus far described can be used only with a freely swingable control surface which can be moved by the aerodynamic action of the stabilizing tab. Where such stabilizing mechanism is utilized, therefore, the pilot's control must be in the nature of a direct pilot-operated control system or a control tab operated control surface. Since the present stabilizing control system has the greatest usefulness in large airplanes, the stabilizing mechanism previously described will ordinarily be used with a control tab operated rudder.

The same principles are, however, applicable to airplanes having power operated control surfaces, and such an installation is shown in Figures 18 to 23, inclusive.

Figures 18, 19:
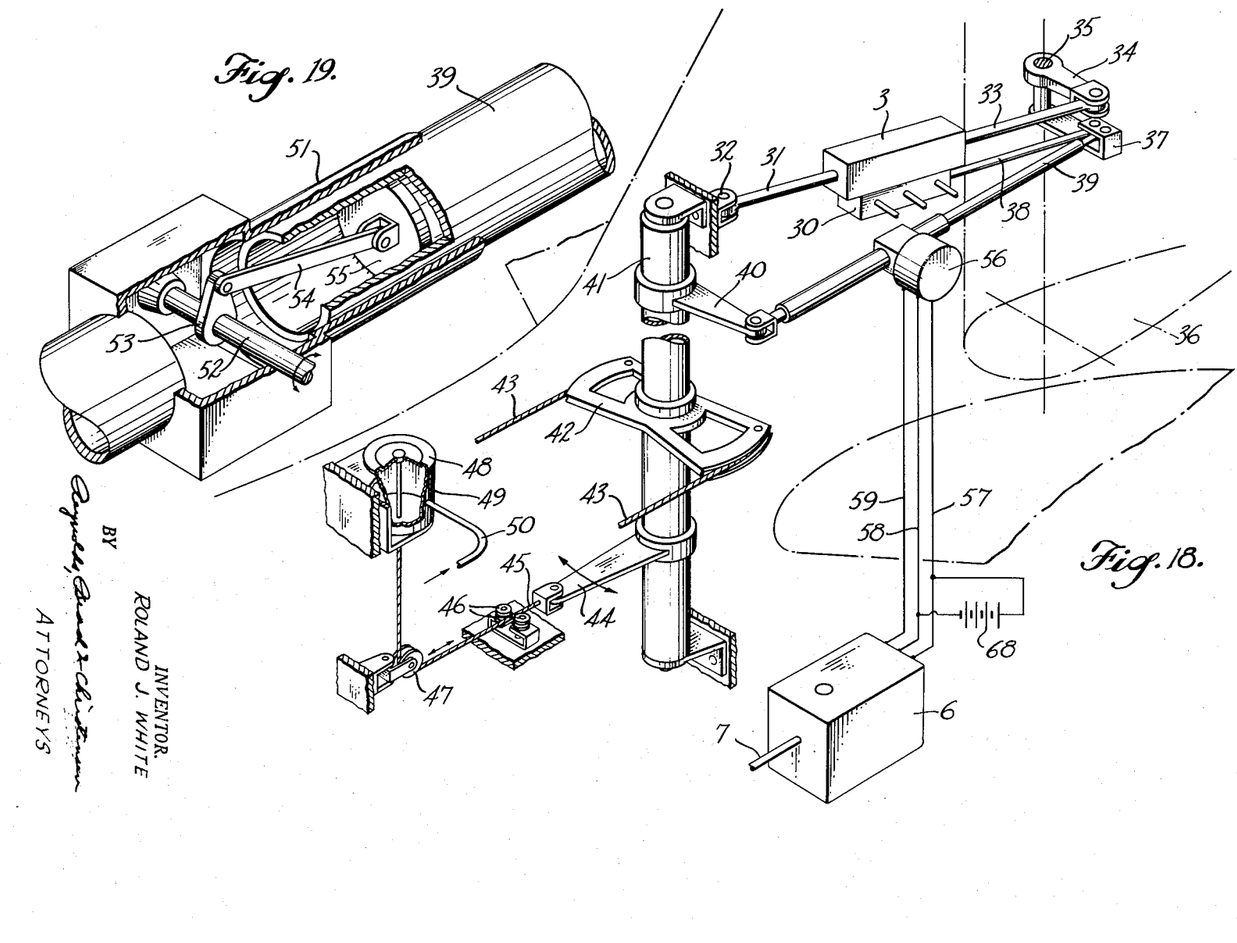
Figure 18 is a diagrammatic perspective view showing a stability control in accordance with the present invention incorporated in a power actuated control system and Figure 19 is a top perspective detail view of a portion of the control mechanism shown in Figure 18.

The pilot-controlled power mechanism in which the stabilizing control is interposed is shown in Figures 18 and 19, as being of the same general type as illustrated in the patent application of Cook et al., Serial No. 189,254, filed October 19, 1950, now U. S. Patent No. 2,672,307 and entitled Airplane Yaw Damper. Such mechanism includes a hydraulic piston and cylinder actuator 3 controlled by a slide valve 30 or an equivalent power actuator. One end of such piston and cylinder actuator is anchored by a rod 31 to a portion of the airplane structure 32 and reacts against that to move rod 33 lengthwise, which is pivoted to the rudder arm 34. This arm or horn is secured to a rod 35 about which the rudder 36 turns. Pivoted on the same axis is a control arm 37 to which the valve rod 38 and control rod 39 are connected.

The control rod 39 is reciprocated by an arm 40 mounted on the rotatable tube 41 turned by the control quadrant 42 to which the pilot's control cables 43 are connected. Because there is little resistance to movement of the valve rod 38, mechanism for producing a resistance to movement of cables 43 is connected to the rod 41, and such mechanism will exert a resistance to movement of such control cables and a force tending to restore them to neutral position which varies in response to the alteration in air speed. This mechanism includes an arm 44 also anchored to the tube 41, to the swingable end of which arm is connected a cable 45 tensioned by air speed responsive mechanism. This cable passes between guide rollers 46 and around a pulley 47 and is anchored to the cap 48 of a pressure chamber 49 having a connection 50 exposed to the impact pressure of the air stream exteriorly of the aircraft. The faster the airplane is flying, the higher will be the pressure within the container 49 corresponding to the impact pressure in the conduit 50. The force on the container end 48, and consequently the tension in cable 45, will therefore vary directly with the impact pressure of the air stream which varies with the air speed.

Cable 45 will be pulled in whichever direction arm 44 swings from neutral, and such pull will be resisted by the force on the cable resulting from the pressure in container 49, acting on the container end 48. Because of the guiding action of pulleys 46 the effectiveness of the tension in cable 45 on arm 44 will increase progressively as the arm swings farther in either direction, because the force will be acting progressively more nearly perpendicular to the arm. The pilot's control therefore receives the "feel" of requiring the exertion of a greater force to effect swing of arm 44 through a given angle, the farther this arm is shifted from neutral position and the greater the speed of the airplane.

The rudder 36 will be swung to the position corresponding to the reciprocation of rod 39 by the pilot's control, disregarding the effect of the stability control, because as arm 37 is swung the valve mechanism 30 will be shifted correspondingly and the hydraulic motor 3 will effect movement of rod 33 only until arm 34 has been swung into registry with arm 37. To obtain this follow up action rod 33 must be of fixed length to maintain the valve mechanism 3 always spaced the same distance from the arm 34. The effective length of rod 31 will vary, however, as the valve 3 moves toward or away from the airplane structure 32, depending upon the shift in the valve mechanism effected by movement of control rod 38.

To superimpose an automatic control function on the power mechanism thus described, the link 39 may be made variable in effective length between arms 37 and 40, so that even though arm 40 remains stationary the position of the rudder may be altered without the pilot by swinging of arm 37 effected by a change in length of link 39, which results in movement of the hydraulic motor 3 until arm 34 again moves into registry with arm 37 in a new position of the rudder 36.

The automatically controlled shifting mechanism for varying the effective length of link 39 is illustrated best in Figure 19 as including a sleeve 51 into which the end of link 39 telescopes. Within the sleeve 51 is journaled a shaft 52 carrying a crank 53. A connecting rod 54 has one end journaled to such crank and its opposite end pivoted to a plug 55 secured in the end of the hollow link 39. As shaft 52 is turned, crank 53 will be rotated in the clockwise direction as seen in Figure 9 to increase the effective length of link 39 to effect swinging of the rudder to starboard, or in the counterclockwise direction to contract link 39 and thereby effect swinging of the rudder to port.

To effect an automatic stabilizing action independently of movement of the pilot's control, a motor 56 connected to shaft 52 for turning it is energized in response to a damped bob weight yaw sensing mechanism 6 which is connected to the motor by electric power wires 57 and 58 and by a control wire 59.

Figure 20:
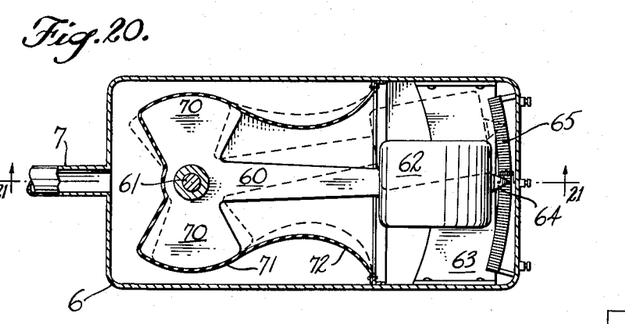
Figure 20 is a horizontal section on line 20—20 of Figure 21
Figure 21:
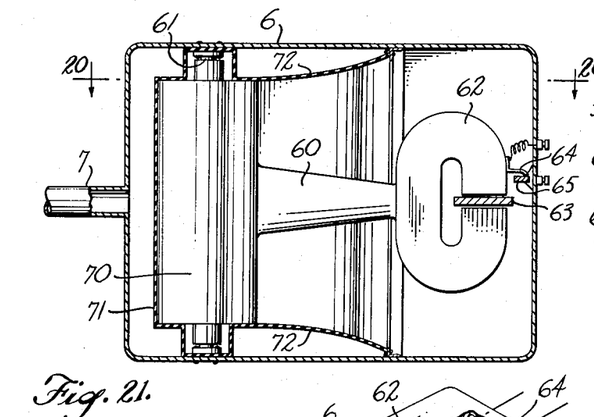
Figure 21 is a vertical section on line 21—21 of Figure 20 of the stability control mechanism applied to the power system of Figure 18.
Figure 22:
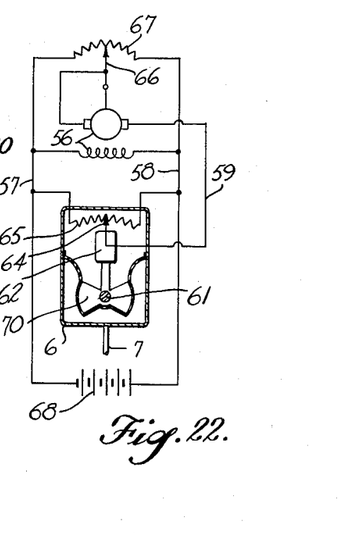
Figure 22 is a wiring diagram of such system.

In Figures 20, 21 and 22 is shown one form of yaw sensing control mechanism for energizing motor 56. Within the box is pivoted an arm 60 on a fixed vertical shaft 61 and a bob weight 62 is carried on the swinging end of such arm. The damping mechanism for such bob weight conveniently may be of the permanent magnet, eddy current type, although as discussed previously the damper instead might be of the type incorporating alternate rotatable and stationary plates, located close together and immersed in liquid, the rotatable plates being connected for rotation by swinging of arm 60. In the form illustrated, however, the bob weight 62 itself is formed as a permanent magnet of the horseshoe type between the poles of which is received the copper arcuate eddy current strip 63.

To energize the motor 56 and to control its direction of operation the bob weight carries the central sliding contact 64 of a potentiometer, which slides along the winding 65. In neutral position the slider should be located approximately centrally between the ends of the winding. The manner in which the elements of the control circuit may be electrically connected is shown in simplified diagrammatic form in Figure 22. In that figure the motor 56 is illustrated as including a wound rotor and a field coil. Also the motor is illustrated as incorporating a motor driven slider 66, movable along the coil 67 of a further potentiometer similar to potentiometer coil 65. The two potentiometer coils 65 and 67 and the motor field winding 56 are all connected in parallel and in parallel with a suitable power source 68. One lead of the wound rotor is connected to the yaw sensing mechanism slider 64 and the other is connected to the follow-up potentiometer slider 66. The connection 59 between the slider 64 and the motor rotor is therefore the control circuit between the yaw sensing device and the stability control operating motor.

If the trailing bob weight 62 is swung to starboard the slider 64 will be moved to the left as seen in Figure 22 along the winding 65, whereupon counterclockwise rotation of motor 56 will be initiated to move the crank 53 as seen in Figure 19 in the counterclockwise direction, thereby contracting link 39 and energizing hydraulic motor 3 to swing the rudder to port as in the broken-line position of Figure 1. Such motor movement in the counterclockwise direction will also swing contact 66 counterclockwise as seen in Figure 22, to move it along a potentiometer coil 67. When this slider reaches a position on such coil corresponding to the position of slider 64 on potentiometer coil 65, the two potentiometers will be in balance so that no current will flow through the control circuit 59 and rotor of motor 56. Consequently, the motor will be deenergized and will remain deenergized until slider 64 is moved again. Moreover, because the difference in potential across the rotor 56 decreases progressively as slider 66 approaches a position corresponding to the position of slider 64 on its winding 65, the speed of the motor 56 will automatically decrease to a stop so that the motor will not overrun the zero potential position.

On the contrary, if the bob weight is displaced to port by yawing movement of the airplane, the slider 64 will be moved to the right as seen in Figure 22, energizing the motor 56 to rotate in a clockwise direction. The crank 53 in Figure 19 will also be rotated clockwise to increase the effective length of link 39, which will energize motor 3 to swing the rudder to starboard. During such motor operation slider 66 will be driven by the motor in a clockwise direction also as seen in Figure 22 until it reaches a position along potentiometer winding 67 corresponding to the position of slider 64 along potentiometer winding 65. The potentiometers will therefore again be in balance so that no current will flow through the rotor of motor 56, and it will be deenergized.

Since the yaw sensing bob weight mechanism is connected to the airplane rudder only through an electrical circuit, the rudder does not exert any aerodynamic opposing force on the bob weight system. Such an aerodynamic restoring force may, however, be produced by the pressure system illustrated in Figures 20 and 21. Such pressure system includes a duct 7 having one end communicating with the interior of the bob weight mechanism 6 casing, and its other end subjected to the impact pressure of the air stream exteriorly of the airplane. Projecting transversely of the bob weight arm 60 are two quadrants 70, and over these extend a flexible sheet 71 which are connected to portions 72 draped between these quadrants and the casing. This sheet divides the casing into a pressurized compartment at the left and an unpressurized compartment at the right as seen in Figures 20 and 21.

When air under pressure is admitted through duct 7 to the pressure chamber within casing 6, the draped portions 72 of the sheet will be distended equally inward, tending to maintain bob weight 62 in its central position. If the bob weight should be shifted to one side or the other by yaw movement of the empennage, the sheet portion 72 at the side of the arm 60 toward which the bob weight moves, for example the upper portion 72 as seen in Figure 20, will tend to be straightened whereas the other portion will be bellied more by the pressure of the air. When the disturbing yaw force has ceased, therefore, the pressure on the straighter wall portion 72 will be greater than the pressure on the other wall portion and therefore will swing the quadrants 70 in a direction to restore the bob weight 62 to its central position.

It will be seen, therefore, that the action of the impact flight air pressure on the flexible wall 72 will be precisely the same as the action of the air stream on the stabilizing tab of the control shown in Figure 1, namely that the air pressure will oppose displacement of the bob weight 62 from central position and when the bob weight has been displaced from such central position will exert a force tending to restore it to such central position. Moreover, the force opposing such bob weight movement and thereafter acting to restore the bob weight will be directly proportional to the impact air pressure of the air stream and consequently will correspond to the speed of the airplane.

Figure 23:
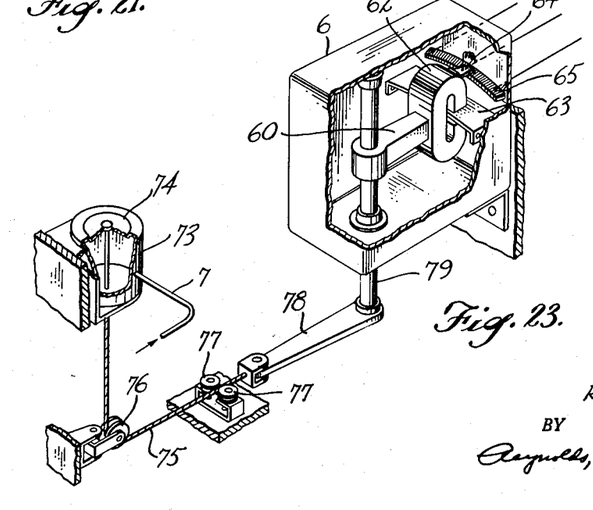
Figure 23 is a top perspective view with parts broken away showing a modified type of stability control mechanism applicable to the power control of Figure 18.

In the modified form of stabilizing control mechanism shown in Figure 23 the bob weight mounting, the potentiometer control features and their operation are precisely the same as described in connection with Figures 20, 21 and 22. The only difference in this form of the device is in the mechanism for applying to the bob weight a force opposing its shifting from neutral position and effective to restore it to its central position which corresponds to the air speed of the airplane. In this instance the air flow impact pressure duct 7 is connected to an auxiliary pressure chamber 73 instead of being connected to the casing 6. To the end of this pressure chamber 74 is connected a cable 75, and this cable extends over a pulley 76 and between guide pulleys 77, and it is also connected to an arm 78 which is mounted on a rod 79 secured to the bob weight arm 60.

The pressure of the air in chamber 73 tends to hold cable 75 taut, and, of course, the faster the airplane speed the greater will be the stress in this cable. Moreover, the farther the bob weight 62 swings from its central position, and hence the greater the angle of swing of arm 78 from neutral, the more effective will be the pull of cable 75 opposing further movement of arm 78 and the bob weight and tending to restore the bob weight to its central position. This mechanism also will therefore function in the same manner as the stabilizing tab 17 of Figures 1 and 2 as far as the aerodynamic effect on the stabilizing mechanism is concerned.

Figures 24, 25, 26, 27:
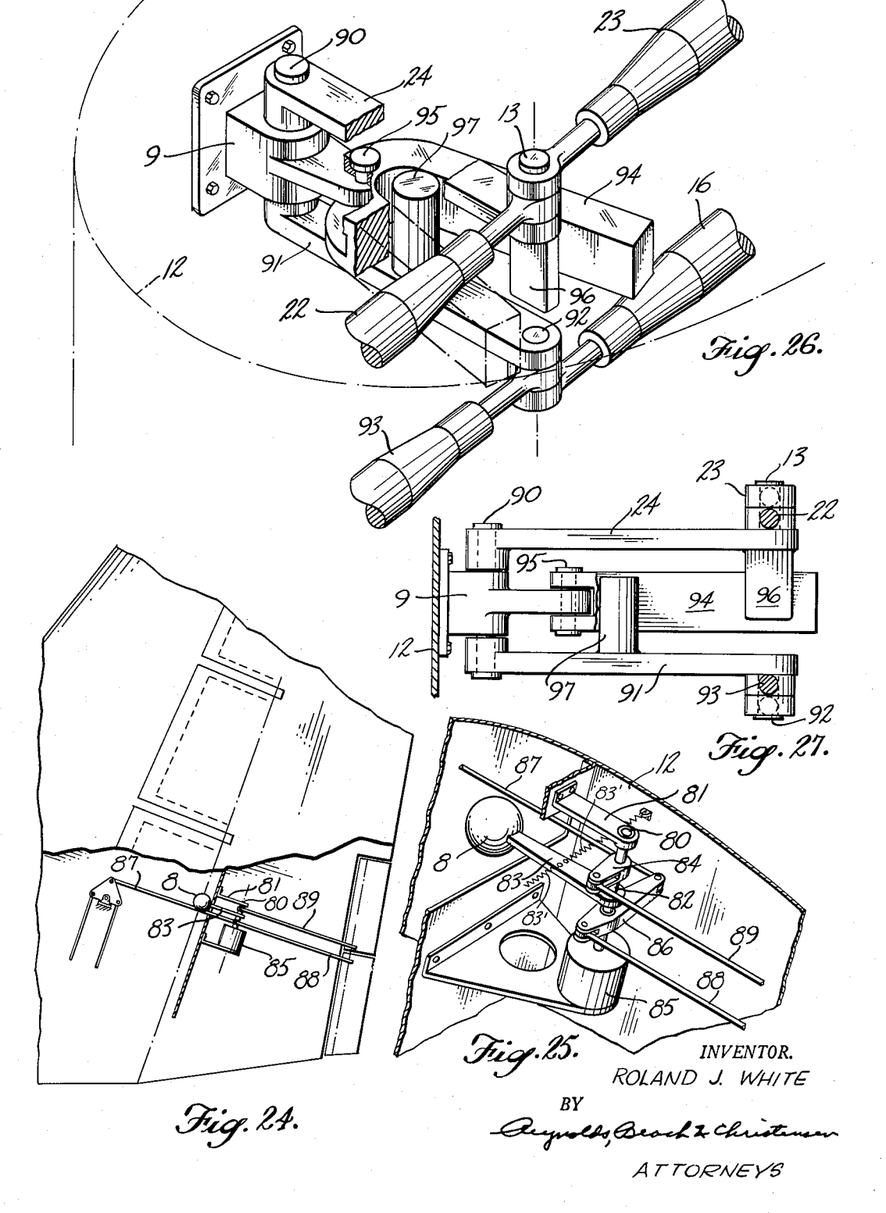
Figure 24 is a fragmentary side elevation view, with parts broken away, showing a bob weight and viscous damper stability control mechanism incorporated in an airplane rudder.
Figure 25 is a fragmentary top perspective view of this mechanism on an enlarged scale.
Figure 26 is a top perspective view with parts broken away illustrating interconnecting mechanism for connecting a voluntary control tab and a stability control tab system together to obtain maximum voluntary control effect when desired.
Figure 27 is a side elevation view of this mechanism with parts broken away.

In Figures 24 and 25 a modification of the stabilizing tab type of mechanism is shown in which the bob weight instead of being housed within the fin is located within the rudder. The structure of the stabilizing control mechanism is very similar to that illustrated in Figures 1, 2 and 3, including the bob weight 8 and the fixed shaft 80 supported from the rudder 12 by a bracket 81 about which the bob weight swings. On such shaft is mounted a sleeve 82, to which the bob weight arm 83 and the crank arm 84 are connected. This sleeve also continues downward into the viscous damper 85 which is of the type shown in Figure 3, housing alternate movable and stationary plates immersed in oil. The permanent magnet eddy current type of damper could, of course, be used instead of the plate and liquid type in a stabilizing control mechanism housed in the rudder.

On the sleeve 82 may be journaled a cross arm 86, to one end of which is pivoted the pilot's control rod 87, and to the other end of which is connected the control tab actuating rod 88. The stabilizing tab actuating rod 89 is pivoted to the swinging end of crank arm 84. Swinging of cross arm 86 or crank arm 84 will therefore effect corresponding movement of the control tab or stabilizing tab respectively.

In this type of installation it is important that the bob weight be located in the plane of the rudder hinge, so that even an abrupt swinging of the rudder 12 effected by the pilot's movement of the control tab for maneuvering will not disturb the bob weight appreciably to move the stabilizing tab opposite to the control tab. It is, of course, desirable for the pivot shaft 80 also to be located quite close to the rudder hinge plane, but the reasons for such location of the control tab cross arm 86 are not as critical as for the positioning of the bob weight. Moreover, it is not essential that such cross arm and the stabilizing control crank arm 84 be rotatable about the same axis, but this is a convenient arrangement. Because the bob weight pivot 80 is inclined rearwardly and upwardly, as shown in Figure 24, and the bob weight 8 is forward of such pivot, opposed light centering spring 83 are connected between its arm 83 and the rudder to hold the bob weight centered in opposition to the force of gravity when the airplane is on the ground.

Although the bob weight 8 will not be displaced by swinging of the rudder, it will be affected by a lateral displacement of the tail of the airplane to set the stabilizing control mechanism in operation in the same manner as described with relation to the installation of Figures 1, 2 and 3.

Where power mechanism is employed to swing an airplane rudder of the type shown in Figures 18 and 19, for example, the airplane pilot will have the ability to control such power mechanism for all angles of attack of the rudder. This result can be assured merely by designing the artificial "feel" mechanism to exert a sufficiently small force under all conditions by making the pressure chamber 49 small enough, or the arm 44 short enough, or the distance between the end of arm 44 and the guide rollers 46 great enough. Where a control tab is utilized as the agency for effecting swinging of the rudder, however, as in the installation shown in Figures 1 and 2, for example, it must be kept in mind that the swinging of the tab merely effects swinging of the rudder and actually such tab movement is always in a direction such that the tab action detracts from the effectiveness of the rudder and fin combination. It is therefore desirable to make the tab as small as practicable.

Shifting of a rudder to an extreme position is seldom required in flight maneuvers, but in some instances it is necessary to move the rudder into an extreme position. For ordinary maneuvering, therefore, a relatively small tab area is required as compared to the tab area which must be used to effect a large deflection of the rudder, particularly at low speed. With the type of stabilizing control mechanism utilizing a stabilizing tab, therefore, such, for example, as shown in Figures 1 and 2, it is possible to combine the action of the pilot-operated control tab and the stabilizing tab when it is necessary to effect unusually large angular movement of the rudder. This result is accomplished by a control tab movement effecting coordinated movement of the stabilizing tab when the control tab approaches one extreme position or the other. Such mechanism is illustrated in Figures 26 to 33, inclusive. While this tab coordinating structure is illustrated as applied to the stabilizing control mechanism shown in Figures 1, 2 and 3, it will be evident that the same mechanism may be used in conjunction with the type of stabilizing mechanism shown in Figure 4 or the type shown in Figures 24 and 25.

The general construction of the tab coordinating mechanism is shown in Figures 26 and 27. Such mechanism is carried by a pivot mounting 9 secured to the rudder 12 adjacent to the rudder axis.

The pivot mounting serves three purposes. The first purpose is to support the pivot pin 90 on the upper end of which is mounted the arm 24 carrying the pivot 13 interconnecting the two links 22 and 23 of the stabilizing tab actuating mechanism as shown in Figure 1. The second purpose of the pivot mounting is to support the swinging arm 91 on the lower end of pivot 90, which arm carries the pivot 92 interconnecting the pilot actuated link 93 and the control tab link 16. The third function of the pivot mounting is to support a freely swingable, U-shaped yoke interposed between the stabilizing mechanism arm 24 and the control mechanism arm 91 and having the portion interconnecting the legs of such yoke secured to the mounting 9 by pivot 95.

The yoke 94 normally floats between the stabilizing mechanism and the control mechanism, but is engageable by a lug 96 projecting from the stabilizing tab linkage pivot 13 into a position between the legs of the yoke 94. Also, arm 91 supporting the control tab actuating linkage pivot carries a post 97 projecting from it into a position between the legs of the yoke for engagement with it.

Figures 28, 29, 30, 31, 32, 33:
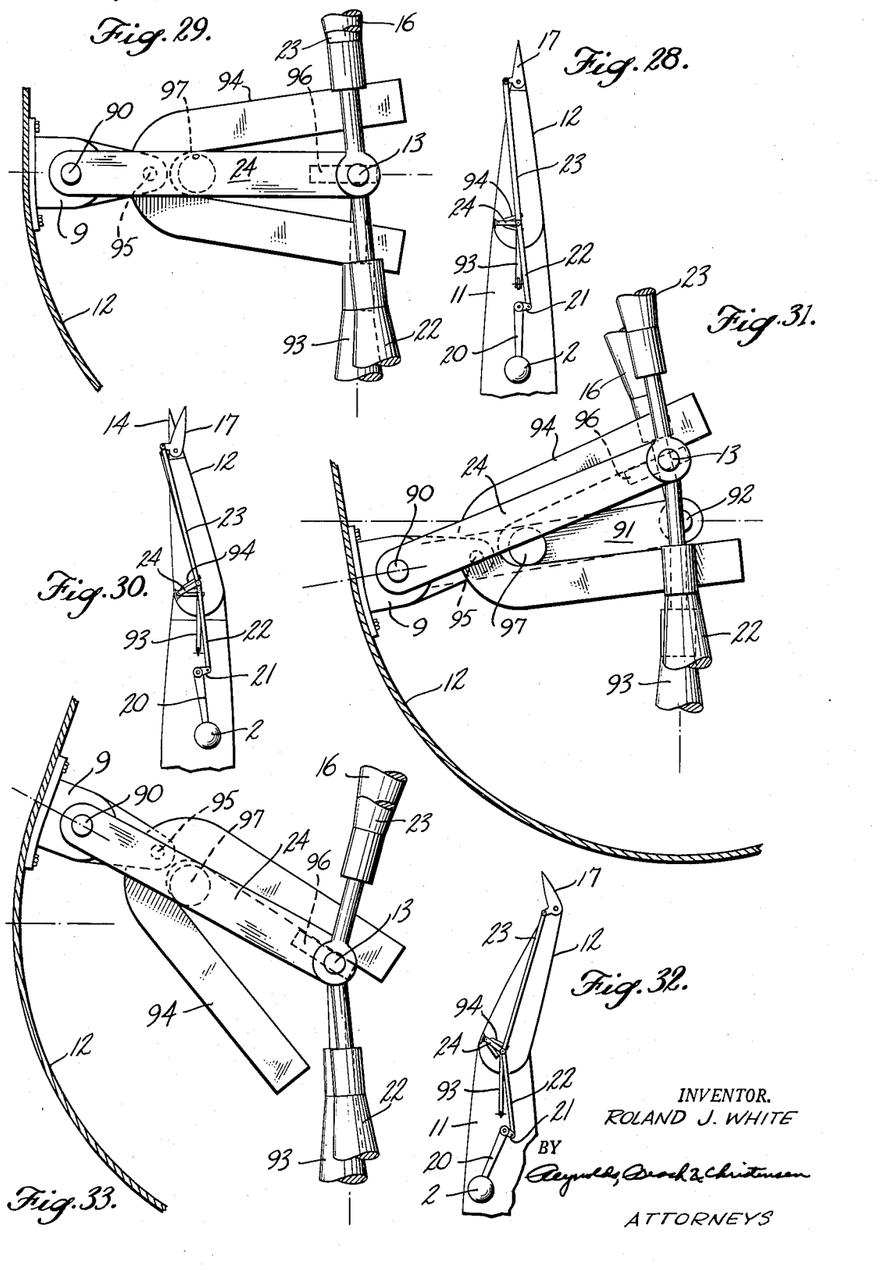
Figure 28 is a small scale plan view of the control system incorporating the interconnecting mechanism of Figures 26 and 27, showing the parts in neutral position.
Figure 29 is a fragmentary plan view of the interconnecting mechanism shown on a comparatively large scale.
Figure 30 is a plan view on a small scale of the control mechanism corresponding to Figure 28, but showing the parts in a different operative position.
Figure 31 is a fragmentary plan view of the interconnecting mechanism on a large scale in a position corresponding to that of Figure 30.
Figure 32 is a plan view of the system incorporating the interconnecting mechanism which corresponds to Figures 28 and 30, but showing the parts in still a different operative position.
Figure 33 is a fragmentary plan view on a relatively large scale showing the interconnecting mechanism in the position corresponding to Figure 32.

As long as the control tab is in its centered or neutral position as shown in Figure 28, the yoke 94 will float freely between the arms 24 and 91 which swing freely relative to each other. The yoke 94 may be entirely out of contact with both the lug 96 and the post 97 in that instance. As long as the control tab remains in or near its neutral position the stabilizing mechanism is operative to swing the stabilizing tab 17 to its limiting position in one direction or the other, the tab being in its limiting position to port in Figure 30 and the stabilizing mechanism for actuating such tab being shown in the corresponding position in Figure 31. In this instance the lug 96 will have engaged one leg of the yoke 94 and swung it into position shown in Figure 31 to engage its other leg with post 97, while the control tab and its actuating mechanism are still in neutral position.

When the control tab is in its neutral position the yoke 94 therefore will not limit swinging of the stabilizing tab 17 to either extreme position relative to the control tab, but such extreme position is not necessarily the limiting position of the stabilizing tab relative to the rudder 12. Thus if the linkage 93, 16 should be moved rearwardly to swing control tab 14 to port, the post 97 moving rearwardly no longer would interfere with further swinging of yoke 94, and the stabilizing tab could swing farther until it reached its limiting position relative to the rudder 12. By such maneuver the control tab would be assisting the stabilizing action of the stabilizing tab.

On the contrary, the pilot always retains control of the stabilizing mechanism for the purpose of maneuvering the airplane. This is particularly important when the airplane is moving comparatively slowly, in which instance it is necessary to utilize large rudder movements to produce the necessary control forces. If the control tab is moved sufficiently far in the direction opposite to movement of the stabilizing tab, therefore, any opposing movement of the stabilizing tab will be reduced, and, in fact, the stabilizing tab may be moved in the same direction from neutral position as the control tab to supplement its action.

If when the stabilizing tab is swung to port as shown in Figure 30 so that the lug 96 has engaged one leg of the yoke 94 and swung it so that its other leg engages the post 97, the control tab linkage 16, 93 is moved to swing the control tab 14 to starboard, such post, by its engagement with the leg of yoke 94, would swing the yoke in a clockwise direction as seen in Figure 31, which, by its engagement with lug 96, would reduce the deflection of tab 17 to port relative to the rudder 12. While it is true that the mechanical advantage of lug 96 on yoke 94 would appear to be greater than the mechanical advantage of post 97 on this yoke, actually this mechanical advantage is only significant with respect to the relative degrees of movement of the elements 96 and 97. It should be kept in mind that the only provision for shifting the stabilizing tab linkage 22, 23 is the bob weight 2, and the force which can be exerted by the pilot on the control tab linkage 93, 16 is far greater than the force which can be produced by the bob weight 2 on the linkage 22, 23, even under the most extreme conditions.

Because of the movement relationship between post 97 and lug 96 with respect to yoke 94, as the control tab linkage is moved in a direction to swing the control tab 14 farther to starboard, post 97 will effect swinging of yoke 94 by engagement with one of its legs so as to accelerate the movement of lug 96, and consequently the swinging of arm 24 and stabilizing tab linkage 22, 23, above the speed of movement of arm 91. As a result stabilizing tab 17 will move toward registry with control tab 14 as the latter moves farther from its neutral position relative to rudder 12. When the control tab has reached its extreme starboard position of Figure 32, the stabilizing tab will have overtaken the control tab so that these two tabs are in registry and will supplement each other to effect maximum deflection of the rudder 12 relative to the vertical fin 11.

It will be noted that when both tabs 14 and 17 are in their extreme starboard position of Figure 32, yoke 94 will coordinate the linkage so that no acceleration of the bob weight 2 will effect any movement of tab 17.

The same is true if the control tab is moved into its extreme limiting position to port relative to rudder 12, in which case the stabilizing tab will be moved by the swinging of yoke 94 into its extreme port position. It will be evident, therefore, that while the stabilizing mechanism will operate independently of the pilot and even without him being conscious of its operation during normal flight conditions, such stabilizing mechanism cannot have an adverse effect on the voluntary control operation of the pilot for maneuvering. On the contrary, by incorporation of the tab coordinating mechanism just described, the stabilizing tab automatically will be moved to supplement the action of the control tab when that is necessary to afford adequate control of the airplane by the pilot. Moreover, the transition from independent stabilizing action of the stabilizing mechanism to control supplementing action of the stabilizing mechanism occurs without any extra manipulation by the pilot being required, for the coordinating mechanism will act automatically as often and for as long a period or as short a period as necessary to provide the control supplementing action of the stabilizing mechanism.

I claim as my invention:

1. Stabilizing control mechanism for an airplane having a yaw control surface movable relative to the airplane, comprising a single inertia weight element, means guiding said element for displacement relative to the airplane in a direction laterally of the airplane by abrupt yawing of the airplane, means operatively connecting said single inertia weight element and the yaw control surface, said single inertia weight element being operable by such displacement to effect swinging of the yaw control surface relative to the airplane in opposition to force of the air stream on the yaw control surface and in a direction to oppose such yawing movement of the airplane, and retarding means connected directly to said single inertia weight element for conjoint movement therewith and operable to exert on said element, during movement thereof relative to the airplane, a force substantially independent of the degree of displacement of said single inertia weight element relative to the airplane but produced by movement of said element, retarding such movement of said element relative to the airplane and correspondingly effecting a substantial lag in movement of the yaw control surface relative to the airplane behind such yawing of the airplane which effected displacement of said single inertia weight element.

2. Stabilizing control mechanism for an airplane having a yaw control surface movable relative to the airplane, comprising a single inertia weight element, means guiding said element for displacement relative to the airplane in a direction laterally of the airplane by abrupt yawing of the airplane, mechanical linkage means directly connecting for corresponding conjoint movement said single inertia weight element and the yaw control surface, said single inertia weight element being operable by such displacement to move said mechanical linkage means and effect swinging of the yaw control surface relative to the airplane in opposition to force of the air stream on the yaw control surface and in a direction to oppose such yawing movement of the airplane, and retarding means connected directly to said single inertia weight element for conjoint movement therewith and operable to exert on said element, during movement thereof relative to the airplane, a force substantially independent of the degree of displacement of said single inertia weight element relative to the airplane but produced by movement of said element, retarding such movement of said element relative to the airplane and correspondingly effecting a substantial lag in movement of the yaw control surface relative to the airplane behind such yawing of the airplane which effected displacement of said single inertia weight element.

3. The stabilizing control mechanism defined in claim 1 in which the retarding means include a plurality of closely spaced parallel stationary plates, a plurality of movable plates interposed alternately between said stationary plates and operatively connected to the inertia weight element for movement therewith, and viscous liquid in which said stationary plates and said movable plates are immersed.

4. The stabilizing control mechanism defined in claim 1, in which the inertia weight element includes a movable permanent magnet, and the retarding means include eddy current plate means mounted adjacent to and coacting with said permanent magnet, movement of said permanent magnet relative to said eddy current plate means producing eddy currents in said eddy current plate means.

5. The stabilizing control mechanism defined in claim 1, in which the inertia weight element includes a movable row of permanent magnets, and the retarding means include an eddy current strip mounted adjacent to and coacting with said permanent magnets and arranged with its length parallel to the magnet row, movement of said permanent magnets lengthwise of said strip producing eddy currents in said strip.

6. Stabilizing control mechanism for an airplane having a swingable control surface, comprising a control tab pivotally mounted on the control surface, pilot-operated means operable to swing said control tab relative to the control surface, a stabilizing tab pivotally mounted on the control surface, inertia means operable to effect swinging of said stabilizing tab relative to the control surface and thereby operable to effect swinging of the control surface relative to the airplane in a direction opposite the direction of swing of said stabilizing tab relative to the control surface, means operable to retard the action of said inertia means and correspondingly to delay swinging of said stabilizing tab relative to the control surface, and lost-motion means interconnecting said control tab and said stabilizing tab and operable by swinging of one of said tabs to effect swinging of the other tab therewith.

7. Stabilizing control mechanism for an airplane having a swingable control surface, comprising a control tab pivotally mounted on the control surface, pilot-operated means operable to swing said control tab relative to the control surface, a stabilizing tab pivotally mounted on the control surface, inertia means operable to effect swinging of said stabilizing tab relative to the control surface and thereby operable to effect swinging of the control surface relative to the airplane in a direction opposite the direction of swing of said stabilizing tab relative to the control surface, means operable to retard the action of said inertia means and correspondingly to delay swinging of said stabilizing tab relative to the control surface, and lost-motion means interengageable between said tabs and operable by swinging of said control tab effected by operation of said pilot-operated means to effect swinging of said stabilizing tab in the same direction as said control tab irrespective of the tendency of said inertia means to swing said stabilizing tab.

8. Control mechanism for a movable airplane control surface, comprising two tabs pivotally mounted on the control surface, means operable to swing each of said tabs relative to the control surface independently of movement of the control surface and independently of each other, and lost-motion means interengageable between said tabs and operable by swinging of one of said tabs in one direction relative to the control surface a predetermined amount to effect simultaneous swinging of the other tab in the same direction.

9. Control mechanism for an airplane control surface, comprising two tabs pivotally mounted on the control surface, means operable to swing each of said tabs independently relative to the control surface, and lost-motion means interengageable between said tabs and operable by swinging of one tab through a predetermined movement relative to the control surface in a given direction to initiate swinging of the other tab relative to the control surface in the same direction and by continued swinging of such first tab operable to accelerate swinging of such other tab to swing through a greater angle than such first tab swings in effecting such swinging of said other tab.

10. Stabilizing control mechanism for an airplane having a fixed stabilizing surface tending to stabilize the airplane against yaw and a yaw control surface adjacent to such stabilizing surface and swingable relative to it, comprising magnet means located in the tail of the airplane and displaceable relative to the tail in a direction laterally of it by abrupt yawing movement of the tail, means operatively connected to move such yaw control surface, directly connected to said magnet means and operable thereby in opposition to force of the air stream to effect swinging of the yaw control surface relative to the stabilizing surface in a direction to oppose such yawing movement of the tail, and eddy current plate means cooperable with said magnet means by the production of eddy currents in said eddy current plate means to retard the displacement of said magnet means relative to the tail and correspondingly to effect a substantial lag in movement of the yaw control surface relative to the stabilizing surface behind the yawing movement of the airplane.

11. Stabilizing control mechanism for an airplane having a tail including a vertical fin and a rudder swingable relative to the vertical fin, comprising magnet means located in the tail of the airplane, means guiding said magnet means for displacement relative to the tail in a direction laterally of it by abrupt yawing movement of the tail, means operatively connected to swing the rudder, directly connected to said magnet means and operable thereby in opposition to force of the air stream to effect swinging of the rudder relative to the vertical fin in a direction to oppose such yawing movement of the tail, and eddy current plate means cooperable with said magnet means by the production of eddy currents in said eddy current plate means to retard the displacement of said magnet means relative to the tail and correspondingly to effect a substantial lag in swinging of the rudder relative to the vertical fin behind yawing movement of the tail.

12. Stabilizing control mechanism for an airplane having a tail including a vertical fin and a rudder swingable relative to the vertical fin, comprising a row of permanent magnets constituting a bob weight located in the tail of the airplane, means guiding said bob weight for displacement relative to the tail in the direction laterally of it by abrupt yawing movement of the tail, means operatively connected to swing the rudder, directly connected to said bob weight and operable thereby in opposition to force of the air stream to effect swinging of the rudder relative to the vertical fin in a direction to oppose such yawing movement of the tail, and an eddy current strip mounted adjacent to said magnets and arranged with its length parallel to the magnet row for movement of said magnets lengthwise of said strip to produce eddy currents therein for retarding the displacement of said bob weight relative to the tail, and correspondingly to effect a substantial lag in swinging of the rudder relative to the vertical fin behind yawing movement of the tail.

13. Stabilizing control mechanism for an airplane having a tail including a swingable yaw control surface, comprising a stabilizing tab pivotally mounted on the control surface, magnet means constituting a bob weight displaceable relative to the tail in a direction laterally of it by abrupt yawing movement of the tail, means directly connected to said magnet means and operable thereby in opposition to force of the air stream on said tab to effect swinging of said tab relative to the control surface, and thereby operable to effect swinging of the control surface relative to the airplane in a direction opposite the direction of swing of said tab relative to the control surface, and eddy current plate means cooperable with said magnet means by the production of eddy currents in said eddy current plate means to retard the displacement of said magnet means relative to the tail, and correspondingly to effect a substantial lag in movement of said tab relative to the control surface and of the control surface relative to the airplane behind yawing movement of the tail.

14. Stabilizing control mechanism for an airplane having a yaw control surface movable relative to the airplane, comprising a single inertia weight element located in the tail of the airplane, means guiding said element for displacement relative to the airplane tail in a direction laterally of the airplane by abrupt yawing of the airplane tail, means operatively connecting said single inertia weight element and the yaw control surface, said single inertia weight element being operable by such displacement to effect swinging of the yaw control surface relative to the airplane in opposition to force of the air stream on the yaw control surface and in a direction to oppose such yawing movement of the airplane tail, and retarding means connected directly to said single inertia weight element for conjoint movement therewith and operable to exert on said element, during movement thereof relative to the airplane tail, a force substantially independent of the degree of displacement of said single inertia weight element relative to the airplane tail but produced by movement of said element, retarding such movement of said element relative to the airplane tail and correspondingly effecting a substantial lag in movement of the yaw control surface relative to the airplane behind such yawing of the airplane which effected displacement of said single inertia weight element.

15. Stabilizing control mechanism for an airplane having a tail including a vertical fin and a rudder swingable relative to the vertical fin, comprising a single inertia weight element located in the tail of the airplane, means guiding said element for displacement relative to the airplane tail in a direction laterally of the airplane by abrupt yawing of the airplane tail, mechanical linkage means directly connecting for corresponding conjoint movement said single inertia weight element and the rudder, said single inertia weight element being operable by such displacement to move said mechanical linkage means and effect swinging of the rudder relative to the vertical fin in opposition to force of the air stream on the rudder and in a direction to oppose such yawing movement of the airplane tail, and retarding means connected directly to said single inertia weight element for conjoint movement therewith and operable to exert on said element, during movement thereof relative to the airplane tail, a force substantially independent of the degree of displacement of said single inertia weight element relative to the airplane tail but produced by movement of said element, retarding such movement of said element relative to the airplane tail and correspondingly effecting a substantial lag in movement of the rudder relative to the vertical fin behind such yawing of the airplane tail which effected displacement of said single inertia weight element.

16. Stabilizing control mechanism for an airplane having a swingable yaw control surface movable relative to the airplane, comprising a stabilizing tab pivotally mounted on the control surface, a single inertia weight element, means guiding said element for displacement relative to the airplane in a direction laterally of the airplane by abrupt yawing of the airplane, means operatively connecting said single inertia weight element and said tab, said single inertia weight element being operable by such displacement to effect swinging of said tab and thereby swinging of the yaw control surface relative to the airplane in opposition to force of the air stream on the yaw control surface and in a direction to oppose such yawing movement of the airplane, and retarding means connected directly to said single inertia weight element for conjoint movement therewith and operable to exert on said element, during movement thereof relative to the airplane, a force substantially independent of the degree of displacement of said single inertia weight element relative to the airplane but produced by movement of said element, retarding such movement of said element relative to the airplane and correspondingly effecting a substantial lag in swinging of said tab, and consequently in swinging of the yaw control surface relative to the airplane behind such yawing of the airplane which effected displacement of said single inertia weight element.

References Cited in the file of this patent

UNITED STATES PATENTS

| | | |
|---|---|---|
| 1,709,359 | Martin | Apr. 16, 1929 |
| 1,822,824 | Roumens | Sept. 8, 1931 |
| 1,885,578 | Boykow | Nov. 1, 1932 |
| 2,092,424 | Potez | Sept. 7, 1937 |
| 2,120,717 | Sikorsky | June 14, 1938 |
| 2,238,403 | Soderquist et al. | Apr. 15, 1941 |
| 2,368,059 | White | Jan. 25, 1945 |
| 2,400,017 | Miles | May 7, 1946 |
| 2,438,309 | Zimmerman | Mar. 23, 1948 |
| 2,514,137 | O'Connor | July 4, 1950 |
| 2,579,570 | Hauptman | Dec. 25, 1951 |
| 2,661,915 | O'Connor | Dec. 8, 1953 |